United States Patent [19]

Leib et al.

[11] Patent Number: 4,994,424
[45] Date of Patent: Feb. 19, 1991

[54] CATALYTIC CRACKING PROCESS WITH IMPROVED FLOW IN SWIRL REGENERATOR

[75] Inventors: Tiberiu M. Leib, Voorhees; Ajit V. Sapre, W. Berlin, both of N.J.

[73] Assignee: Mobil Oil Corporation, New York, N.Y.

[21] Appl. No.: 431,949

[22] Filed: Nov. 6, 1989

[51] Int. Cl.[5] .................. B01J 38/36; B01J 29/38; C01G 11/18; C01B 21/20

[52] U.S. Cl. .................... 502/41; 502/21; 502/42; 502/515; 208/113; 208/120; 208/164; 423/235

[58] Field of Search ............... 208/164; 422/223, 140; 34/57 A; 502/41

[56] References Cited

U.S. PATENT DOCUMENTS

| | | | |
|---|---|---|---|
| 3,817,280 | 6/1974 | Celani | 208/164 |
| 3,904,548 | 9/1975 | Fagan et al. | 422/223 |
| 3,974,091 | 8/1976 | Parker et al. | 34/57 A |
| 4,036,779 | 7/1977 | Schatz et al. | 208/164 |
| 4,073,717 | 2/1978 | Aliev et al. | 208/164 |
| 4,081,249 | 3/1978 | Baillie | 208/164 |
| 4,176,083 | 11/1979 | McGovern et al. | 208/164 |
| 4,325,833 | 4/1982 | Scott | 208/164 |
| 4,443,551 | 4/1984 | Lionetti et al. | 208/164 |
| 4,606,810 | 8/1986 | Krambeck et al. | 208/164 |
| 4,670,410 | 6/1987 | Baillie | 208/164 |
| 4,828,802 | 5/1989 | Colvert et al. | 422/223 |
| 4,843,050 | 6/1989 | Rahlwes et al. | 208/164 |

*Primary Examiner*—Helane Myers
*Attorney, Agent, or Firm*—A. J. McKillop; C. J. Speciale; Richard D. Stone

[57] ABSTRACT

An improved process and apparatus are disclosed for fluidized catalytic cracking of hydrocarbons using a swirl type catalyst regenerator. Multiple, symmetrically spaced spent catalyst inlets are provided for addition of coked catalyst to the regenerator. Preferable a single catalyst outlet, for withdrawal of regenerated catalyst, is provided in the center of the regenerator. Use of multiple symmetrical inlets and a central catalyst outlet greatly reduce stagnant regions in the bed.

12 Claims, 3 Drawing Sheets

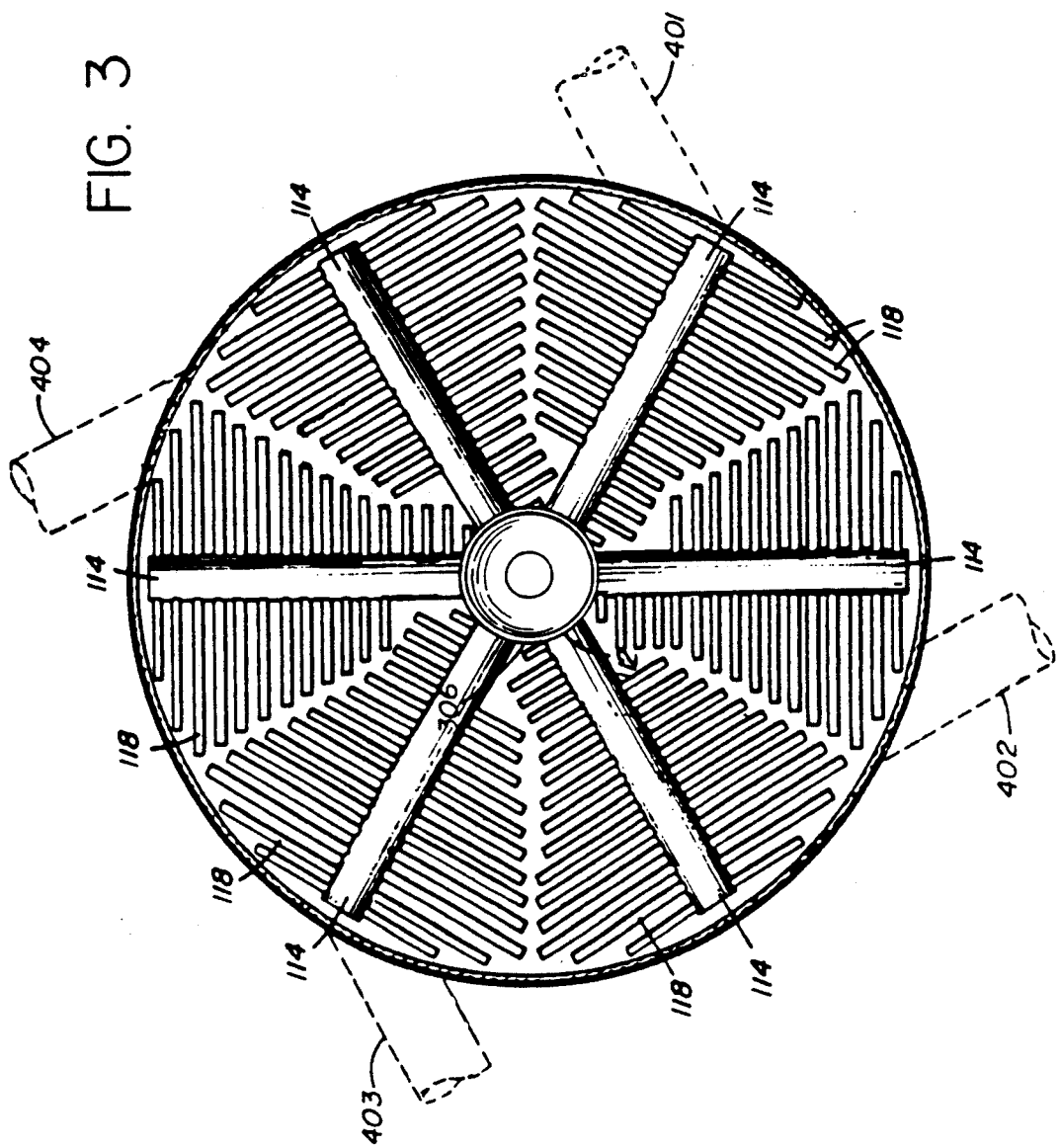

CATALYTIC CRACKING PROCESS WITH IMPROVED FLOW IN SWIRL REGENERATOR

BACKGROUND OF THE INVENTION

1. Field of the Invention

The invention relates to the regeneration of fluidized catalytic cracking catalyst.

2. Description of Related Art

Catalytic cracking of hydrocarbons is carried out in the absence of externally supplied H2, in contrast to hydrocracking, in which H2 is added during the cracking step. An inventory of particulate catalyst is continuously cycled between a cracking reactor and a catalyst regenerator. In the fluidized catalytic cracking (FCC) process, hydrocarbon feed contacts catalyst in a reactor at 425C-600C, usually 460C-560C. The hydrocarbons crack, and deposit carbonaceous hydrocarbons or coke on the catalyst. The cracked products are separated from the coked catalyst. The coked catalyst is stripped of volatiles, usually with steam, and is then regenerated. In the catalyst regenerator, the coke is burned from the catalyst with oxygen containing gas, usually air. Coke burns off, restoring catalyst activity and simultaneously heating the catalyst to, e.g., 500C-900C, usually 600C-750C. Flue gas formed by burning coke in the regenerator may be treated for removal of particulates and for conversion of carbon monoxide, after which the flue gas is normally discharged into the atmosphere.

Most older FCC units regenerate the spent catalyst in a single dense phase fluidized bed of catalyst. The single dense bed usually flows in either a swirl pattern, or in a crossflow pattern. These units work, but at relatively low efficiency compared to more modern designs. The older units have had problems in establishing a desired gas flow through the bed, or were considered inefficient because they maintained the catalyst as a "bubbling" dense phase fluidized bed. Bubbling dense beds have never worked as well in large refinery units as they do in pilot plant size units. Much of the deficiency in operation was laid to the presence of large bubbles in the bed, which meant that the dense phase fluidized bed was not being efficiently used much of the time.

Most new units are of the High Efficiency Regenerator (H.E.R.) design using a coke combustor, a dilute phase transport riser, and a second dense bed, with recycle of some hot, regenerated catalyst from the second dense bed to the coke combustor. Units of this type are shown in U.S. Pat. No. 3,926,778 (which is incorporated by reference) and many other recent patents. The H.E.R. design is used in most new units because it permits operation of an FCC with less catalyst inventory (and hence less catalyst loss), and because such units tend to have both less CO emissions and less NOx emissions than the single dense bed regenerators.

The high efficiency design uses a fast fluidized dense bed for coke combustion. These dense bed are intensely agitated, and large bubbles are not stable in such beds. The high efficiency regenerator design can achieve complete regeneration of catalyst with perhaps half the catalyst inventory required in the older regenerators, using a bubbling fluidized bed.

In FCC units, much of the catalyst is lost due to attrition, and an increase in catalyst inventory increases catalyst loss to attrition. Much of the activity loss of the FCC catalyst is due to steaming in the regenerator. This steaming is not intentional, but most regenerators operate with 5-10 psia steam partial pressure (due to entrained stripping steam, and water of combustion). Thus the regenerator is not only a regenerator, it is a catalyst steamer, and deactivator. Increased catalyst inventory in the regenerator leads to increased steaming and deactivation of the FCC catalyst.

There is therefore a great incentive to do everything possible to reduce the catalyst inventory of a regenerator, and to improve the efficiency of the regenerator. That is why a majority of new FCC construction uses the high efficiency regenerator design.

Unfortunately, it has not been economically justifiable to convert older style, single dense bed regenerators to the modern H.E.R. design because of the high capital cost associated with simple scrapping of the old single bed regenerator. Attempts to simply use the old single bed regenerator as part of a modern two stage, H.E.R. design have not been too successful, as the old single stage units are much larger than either of the beds in an H.E.R. unit. Another complication has been that many of the older units were not designed to operate at the higher temperatures associated with complete CO combustion.

Rather than scrap older FCC regenerators, refiners have tried to improve them, and the FCC process, as much as possible with improvements in catalyst and catalyst additives.

Actually, refiners have known for many years that there were problems with bubbling bed regenerators in general and with the swirl type regenerator in particular. A typical swirl type regenerator is shown in U.S. Pat. No. 3,817,280, which is incorporated herein by reference.

The swirl type regenerator adds spent catalyst to an FCC regenerator having a generally circular cross section. The catalyst is added via a single inlet, to the dense bed of catalyst in the regenerator in a tangential direction, imparting a swirling motion to the dense bed. The catalyst swirls around roughly ¾ of the regenerator, and then is withdrawn as regenerated catalyst for reuse in the FCC process.

The swirl regenerator is an elegant concept which causes problems in practical operation. The spent catalyst, laden with coke and poorly stripped hydrocarbons, is added to one portion of the bed. The catalyst removed after one radial traverse of the bed has essentially no unstripped hydrocarbons, and a very low level of residual coke or carbon on catalyst. For efficient operation, the amount of regeneration gas added should roughly equal the amount of combustible substance to be burned, and this means that very large amounts of combustion air are needed where spent catalyst is added, and almost no combustion air is needed where catalyst is withdrawn.

FCC operators have provided means for improving the distribution of combustion air to such regenerators. In U.S. Pat. No. 3,817,280, a better way of controlling the distribution of combustion air was provided. The air distribution grid beneath the bubbling dense bed was radially segmented, and means were provided for adjusting the flow of combustion air to each radial segment. In this way it was possible to fine tune the amount of air added to different radial segments of the bubbling fluidized bed.

The approach of U.S. Pat. No. 3,817,280 provided a better way to distribute the air to a swirl type regenerator. It ignored the problem of inefficiencies regards the distribution of solids to a swirl type regenerator.

In U.S. Pat. No. 3,904,548, which is incorporated herein by reference, recognized the problem of efficient operation of a large size fluidized bed. A baffle was provided, adjacent the tangential catalyst inlet, to mix some regenerated catalyst with incoming stripped catalyst. The baffle provided an expanding annulus of about 20 degrees in the direction of catalyst flow, to prevent undesired catalyst circulation.

The operation of swirl, and other, types of regenerators was significantly improved by the use of CO combustion promoters, discussed hereafter.

U.S. Pat. No. 4,072,600 and 4,093,535 teach use of combustion-promoting metals such as Pt, Pd, Ir, Rh, Os, Ru and Re in cracking catalysts in concentrations of 0.01 to 50 ppm, based on total catalyst inventory. Such combustion promoters improve the rate of CO burning in all types of regenerators, both modern and old. CO combustion promoters help minimize CO emissions, but can cause an increase in the amount of nitrogen oxides (NOx) in the regenerator flue gas. It is difficult in a catalyst regenerator to completely burn coke and CO in the regenerator without increasing the NOx content of the regenerator flue gas. Swirl type regenerators are especially troublesome in this regard, i.e., enough excess air and CO combustion promoter can be added to meet CO limits, but this will greatly increase NOx emissions.

We realized that there was a problem with the basic design of the swirl type regenerator, not so much in the way air was distributed, but with the way the catalyst was distributed. We studied swirl type regenerators, and found that in many units 50% or more of the dense bed of catalyst was relatively stagnant.

We learned that use of a baffle, such as one disclosed in U.S. Pat. No. 3,904,548, did not significantly help reduce stagnant regions in the catalyst bed. The baffle of '548 would help reduce or eliminate bypassing, but would not address the problem of stagnant regions in the catalyst bed.

We have discovered a way to overcome many of the deficiencies of catalyst distribution in these swirl type regenerators by making changes in the way that catalyst was added. We were able to achieve even more improvement by modifying the way in which catalyst was withdrawn from these regenerators.

BRIEF SUMMARY OF THE INVENTION

Accordingly, the present invention provides a process for the fluidized catalytic cracking (FCC) of a hydrocarbon by contact of a crackable hydrocarbon with a source of regenerated FCC catalyst in a cracking reactor to produce catalytically cracked products and coked FCC catalyst which is regenerated in a swirl-type regenerator which maintains a catalyst inventory of at least 100 tons of catalyst as a dense phase, bubbling fluidized bed of catalyst having a depth of at least 8 feet within a regenerator vessel having a diameter of at least 10 feet, and wherein said bubbling dense phase bed moves in a swirling direction within said regenerator due to tangential addition of coked cracking catalyst via a single coked catalyst inlet having an inlet diameter of at least 1 foot, said inlet being connective with one side of said regenerator and said coked catalyst is regenerated in said dense bed by contact with an upflowing supply of oxygen or an oxygen containing gas to produce regenerated catalyst which is withdrawn from said catalyst bed via a catalyst outlet which is radially displaced from said catalyst inlet, characterized by split flow addition of said coked cracking catalyst through at least two symmetrically placed catalyst inlets which tangentially discharge said coked catalyst into said catalyst bed in the same tangential direction.

In an apparatus embodiment, the present invention provides an apparatus for the regeneration of coked, fluidized cracking catalyst in a swirl type regenerator means adapted to contain a dense phase fluidized bed of catalyst within a regenerator vessel having a diameter of at least 15 feet, and comprising: a single coked catalyst inlet operatively connected with said regenerator which discharges a source of coked fluidized cracking catalyst into said dense bed in a tangential direction to impart a swirling motion thereto; a regeneration gas inlet and distribution means within said dense phase fluidized bed adaptive to admit and distribute an upflowing supply of oxygen or an oxygen containing gas to produce regenerated catalyst; a catalyst outlet operatively connected with said dense phase fluidized bed for removal of regenerated catalyst from said fluidized bed; characterized by a plurality of symmetrically spaced catalyst inlets adaptive to tangentially discharge said coked catalyst into said catalyst bed in the same tangential direction.

BRIEF DESCRIPTION OF THE DRAWINGS

FIG. 3 is a simplified, cross sectional view of an improved swirl type regenerator of the present invention, with multiple catalyst inlets and a central catalyst withdrawal point.

DETAILED DESCRIPTION

The invention can be better understood with reference to the drawings, and a discussion of the prior art swirl type regenerator.

Figure 1:
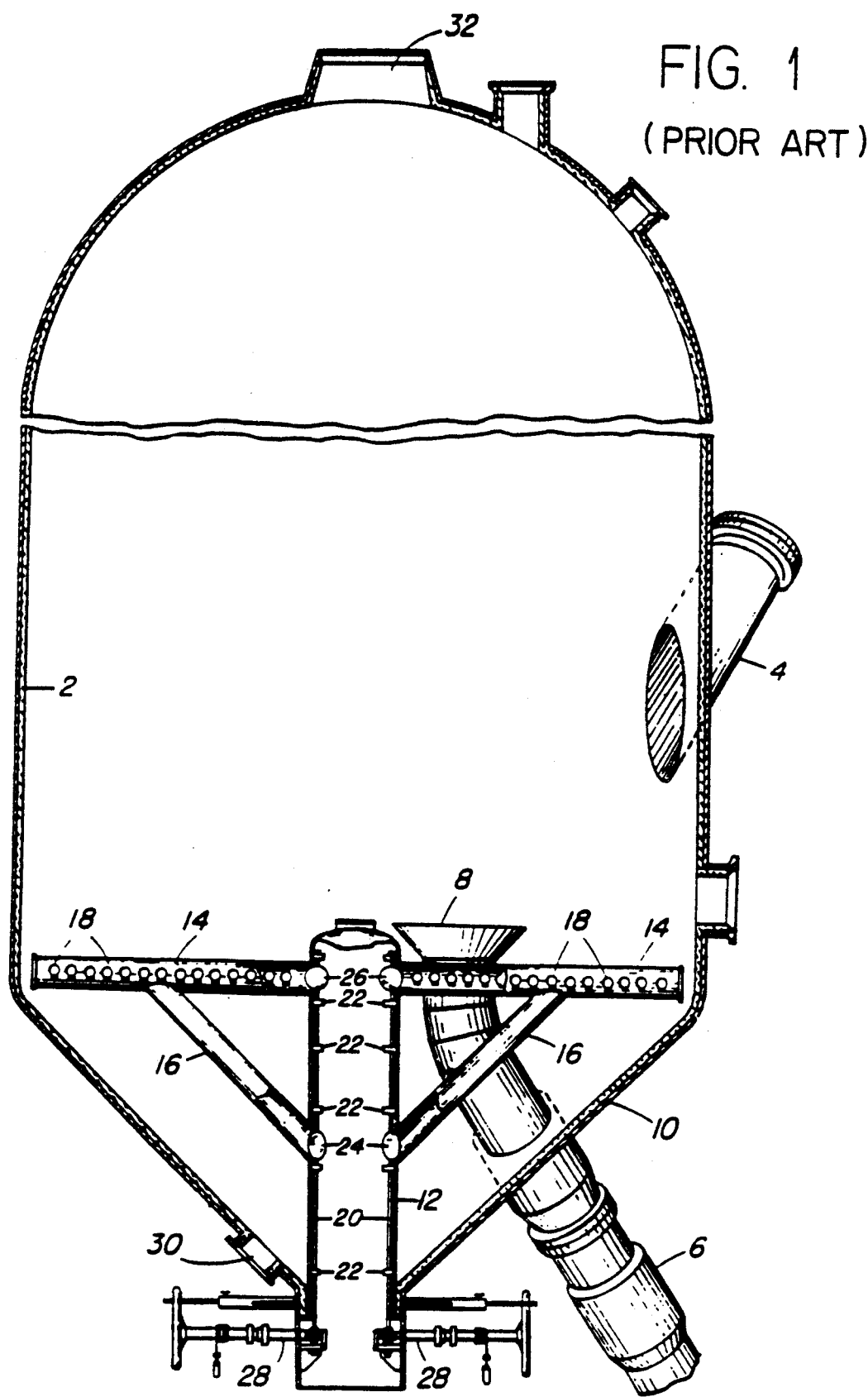
FIG. 1 (prior art) is a simplified, cross-sectional view of a swirl type regenerator, taken from U.S. Pat. No. 3,817,280.

Referring now to FIG. 1 by way of example, there is shown in elevation a regeneration vessel comprising a regeneration gas distributor means with flow control valve means in the inlet of each supply conduit to a given regeneration gas distributing means. In the arrangement of FIG. 1, a regenerator vessel 2 is shown. Cyclone means with connecting diplegs normally positioned in the upper portion of a regeneration vessel are not shown to simplify the drawing. A catalyst inlet conduit 4 is provided for introducing spent catalyst containing carbonaceous deposits to the regeneration vessel. The conduit 4 may be positioned to provide for tangential introduction of the finely divided catalyst particles to the regeneration vessel. A conduit 6 extending upwardly into the vessel and terminating in a funnel shaped mouth 8 above the distributor grid provides means for withdrawing regenerated catalyst from the vessel. The bottom of the regenerator vessel 2 is provided with a conical bottom 10. A regeneration gas inlet conduit or manifold 12 concentrically extends upwardly through the conical bottom of the vessel and terminates at a level substantially coinciding with the lowest vertical wall portion of the vessel. A plurality of conduit means 14 extend substantially horizontally outwardly from said vertically extending concentric manifold to provide a grid means more clearly identified in FIG. 2. Support conduits 16 in open communication with conduits 12 and 14 provide structural support to the grid mean of FIG. 2 in addition to providing additional regeneration gas to outer portions of each segment of the distributing grid. Pipe means 18 horizontally extends substantially at right angles to distributing conduits 14 as shown more clearly in FIG. 2. Vertical rods 20 retained by bearings 22 adjacent the inner wall of manifold pipe 12 are provided with disc shape plates 24 and 26 which are valve means for adjusting the flow of gases passing from manifold 12 into either conduit 14 or 16. Thus by turning the rods, the disc shaped plates attached thereto may be turned to provide a restricted flow of gas into the pipe or a substantially unrestricted flow of gas into the pipe. The bottom end of each rod is provided with a gear in matching engagement with a work gear on the end of an adjusting rod 28 extending through the wall of inlet pipe 12 external to the vessels conical bottom 10. The adjusting rod is provided with a hand wheel on the outside end thereof and means are provided for locking the hand wheel in a selected position. A covered manhole 30 is provided in the lower portion of the conical bottom 10.

In the apparatus of FIG. 1, the regeneration gas enters the bottom of the vessel by vertically extending conduit 12 and passes out through conduits 16 and 14 to distributor pipes 18 with the flow through each conduit 16 and 14 controlled by disc valves 24 and 26 rigidly attached to adjusting rod means 20. The regenerating gas passed to pipes 18 then passes out through holes or nozzles along the bottom surface of the pipes and then upwardly through a bed of catalyst to be regenerated under fluid phase regeneration conditions. Regenerated catalyst is withdrawn from the vessel above the grid by conical inlet 8 communicating with conduit 6. The inlet to withdrawal conduit 6 may be as shown in FIG. 1 or it may be extended upwardly into the vessel so that regenerated catalyst is withdrawn from an upper portion of the dense fluid bed of catalyst rather than a lower portion thereof as shown. Regeneration gas after passing through suitable cyclone separators not shown and positioned in an upper portion of the regenerator passes into a plenum chamber not shown and then out the top of the regenerator vessel as by opening 32.

Figure 2:
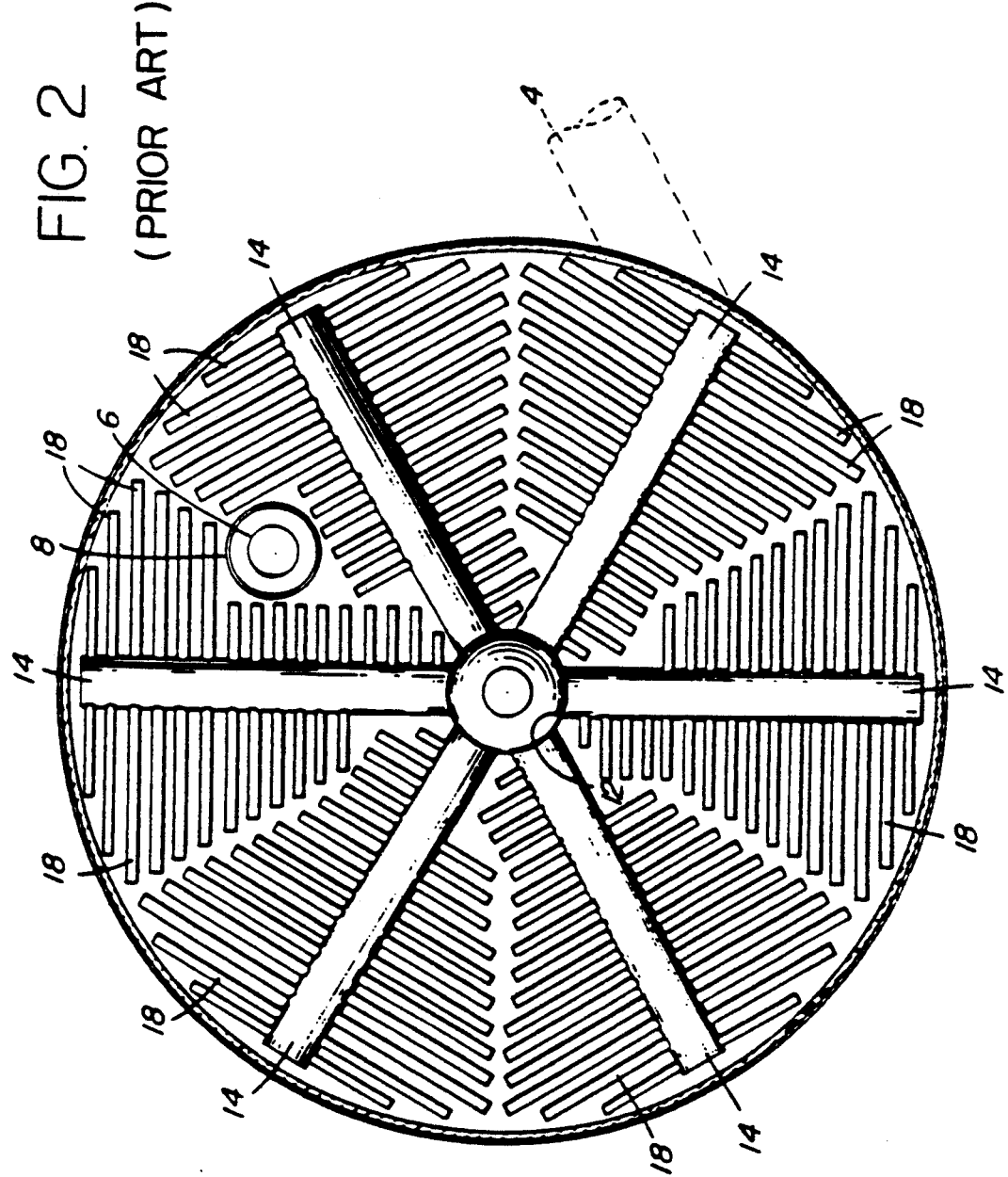
FIG. 2 (prior art) is a cross sectional view of the swirl type regenerator of U.S. Pat. No. 3,817,280.

In the arrangement of FIG. 2 there is shown the segmented regeneration gas distributor grid comprising pipes 18, distributing conduits 14 and concentric regeneration gas inlet conduit 12 which is closed at its upper end positioned within vessel 2. Catalyst withdrawal funnel 8 connected to conduit 6 is shown positioned between two of the segmented distributing grids. The dotted conduit 4 at the side of the drawing is intended to show the relationship of the catalyst inlet conduit 4 to the withdrawal funnel 8.

FIG. 3 shows one preferred embodiment of the present invention, a swirl type regenerator with four symmetrical catalyst inlets and a central catalyst withdrawal sink.

FIG. 3 is closely patterned after FIG. 2, and elements 112-118 correspond to elements 12-18, respectively in FIG. 2. Thus the distributor grid comprises pipes 118 and conduits 114. Catalyst is tangentially added via four inlets, inlets 401, 402, 403 and 404. Regenerated catalyst is withdrawn via central sink or outlet 306 for reuse in the FCC process.

EXPERIMENTS—COMPUTER SIMULATIONS

Extensive experimental work studying commercial and laboratory size fluidized bed, and further work on developing a computer program which allowed us to accurately model the behavior of large, commercial FCC regenerators.

As a result of our study, we discovered that the conventional swirl type regenerator, such as that disclosed in FIG. 1 and FIG. 2, leaves 60% of the dense phase, bubbling fluidized bed of catalyst relatively stagnant. We define a stagnant region as one where predicted streamlines form a closed loop, i.e., the net flow of catalyst from inlet to outlet is outside the boundaries of this loop.

We tried to improve this design using baffles, or countercurrent catalyst addition. Most things we tried actually increased the size of the stagnant regions. None could reduce the size of the stagnant region below 50%.

We then discovered that by shifting the catalyst outlet to the center of the unit, and by splitting tangential catalyst addition between two inlets, we were able to make a majority of the catalyst bed active. By going to four symmetrically placed, tangential catalyst inlets we were able to achieve a breakthrough in bed behavior, and get a bed with only 5% stagnant region.

Splitting the coked catalyst flow into two or four points of catalyst addition will involve a substantial capital expense, because these lines are so large, and because the pipe should be made symmetrical, to ensure an even distribution of catalyst between multiple inlets. The cost of moving the catalyst sink or bathtub is substantial, because this line is even larger than the catalyst inlets. The catalyst outlet is typically 5 to 10 feet in diameter, so it is expensive to move such a large line, and to modify the base of the regenerator to accommodate such a large line in a new location. These costs are small, however, compared to the benefit of reducing the stagnant regions of the regenerator so much.

The results of the computer simulation are reported below in the table. The first reported case is that of the prior art design, as shown in U.S. Pat. No. 3,817,280.

|   | INLET | OUTLET | STAGNANT REGION, % |
|---|---|---|---|
| 1 | ONE | ONE TO SIDE | 60% |
| 2 | 2 SYMMETRICAL | CENTER | 40% |
| 3 | 4 SYMMETRICAL | CENTER | 5% |
| 4 | 2 COUNTER | CENTER | 70% |
| 5 | 2 COUNTER | ONE TO SIDE | 80% |
| 6 | BAFFLE A | ONE TO SIDE | 50% |
| 7 | BAFFLE B | ONE TO SIDE | 65% |

2 symmetrical inlets means that there were two tangential inlets 180 degrees apart from one another. In the case of 4 symmetrical inlets, they were spaced 90 degrees apart, much as shown in FIG. 3.

2 countercurrent inlets were spaced 180 degrees apart, one adding catalyst clockwise and one adding catalyst counterclockwise. The inlets pointed away from the catalyst outlet in simulation 5.

In simulation 7, with Baffle A, the baffle was placed at the boundary between the stagnant region and the main catalyst flow, above the far edge of the coked catalyst inlet in the direction of the swirl, thus cutting streamlines and decreasing bypassing. The baffles length was 3.0 feet, and it was located along a radius, with the far edge 1.5 feet from the regenerator wall.

In simulation 8, with Baffle B, the baffle was placed slightly further in the direction of the swirl and also slightly closer to the walls of the regenerator. Its length was the same as that of Baffle A, but its far edge was only 1 foot from the regenerator wall.

In U.S. Pat. No. 3,904,548, the baffle was a curved, upwardly extending baffle placed inwardly from the other wall of the regenerator. The baffle would prevent short-circuiting of catalyst, ensuring that more of the spent catalyst entering the bed would radially traverse the bed, rather than bypass the bed and exit prematurely. The baffle of U.S. Pat. No. 3,904,548 corresponds most closely to Baffle A.

The approximate dimensions of a typical swirl type regenerator, associated with a typical 60,000 BPD cracking unit are as follows. The overall ID of the regenerator vessel is 36 feet. The catalyst flow is 3600 tons/hr into the regenerator. The catalyst is added via one tangential inlet pipe having an ID of 36 inches. The catalyst velocity as it leaves the inlet is about 6 feet/sec. It is discharged into a dense phase fluidized bed of catalyst having a depth of about 10 feet. The catalyst sink, or bathtub, has an opening of 96 inches for withdrawal of hot, regenerated catalyst.

The conditions in the regenerator re. air flow, temperature, catalyst type, are all conventional. The invention has nothing to do with a new catalyst, it is directed solely to reducing the stagnant regions in existing swirl type regenerators to improve their operation.

Improved catalyst flow in the dense bed of a swirl type regenerator will increase the carbon burning capacity of the regenerator, allowing the regenerator to produce catalyst with lower residual carbon levels, or alternatively to increase catalyst throughputs. The better operation of the dense bed will greatly simplify the design and operation of the air grid used to add combustion air. Because of more uniform bed operation, and more efficient use of combustion air, there will be a reduction in CO emission, and a reduction in NOx emissions that would otherwise be associated with localized high concentrations of air due to stagnant regions in the prior art design.

We claim:

1. A process for the fluidized catalytic cracking (FCC) of a hydrocarbon by contact of a crackable hydrocarbon with a source of regenerated FCC catalyst in a cracking reactor to produce catalytically cracked products and coked FCC catalyst which is regenerated in a swirl regenerator which maintains a catalyst inventory of at least 100 tons of catalyst as a dense phase, bubbling fluidized bed of catalyst having a depth of at least 8 feet within a regenerator vessel having sides and a diameter of at least 10 feet, and wherein said bubbling dense phase bed moves in a swirling direction within said regenerator due to tangential additional of coked cracking catalyst via at least two symmetrically placed coked catalyst inlets on the sides of said regenerator having an inlet diameter of at least 1 foot, said inlets tangentially discharging said coked catalyst into said catalyst bed in the same radial direction and said coked catalyst is regenerated in said dense bed by contact with an upflowing supply of oxygen or an oxygen containing gas to produce regenerated catalyst which is withdrawn from said catalyst bed via a catalyst outlet which is radially displaced from said catalyst inlets.

2. The process of claim 1 further characterized in that a single regenerated catalyst outlet is used, and that said outlet is located in he center of said regenerator vessel.

3. The process of claim 2 further characterized in that two symmetrically placed catalyst inlets, located 180 degrees apart, are used for admission of coked catalyst.

4. The process of claim 2 further characterized in that four symmetrically placed catalyst inlets, located 90 degrees apart, are used for admission of coked catalyst.

5. The process of claim 1 further characterized in that the regenerator produces flue gas comprising CO and oxides of nitrogen (NOx) and said split flow addition of coked catalyst reduces the CO and NOx content of said flue gas.

6. The process of claim 1 further characterized in that the regenerator has a coke burning capacity and said split flow addition of coked catalyst increases the coke burning capacity of said regenerator by at least 35%.

7. The process of claim 1 further characterized in that the swirling dense bed in said regenerator comprises at least 35% stagnant area and said split flow addition of coked catalyst reduces the stagnant area of said regenerator by at least 35%.

8. A process for the fluidized catalytic cracking (FCC) of a hydrocarbon by contact of a crackable hydrocarbon with a source of regenerated FCC catalyst in a cracking reactor to produce catalytically cracked products and coked FCC catalyst which is regenerated in a swirl regenerator having sides which maintains a catalyst inventory of at least 100 tons of catalyst as a dense phase, bubbling fluidized bed of catalyst having a depth of at least 8 feet within a regenerator vessel having a diameter of at least 10 feet, and wherein said bubbling dense phase bed moves in a swirling direction within said regenerator due to tangential addition of coked cracking catalyst via at least two symmetrically placed, radially distributed catalyst inlets, which tangentially discharge said coked catalyst into said catalyst bed in the same radial direction, said inlets having an inlet diameter of at least 1 foot, said inlets being connective with one side of said regenerator, said coked catalyst is regenerated in said dense bed by contact with an upflowing supply of oxygen or an oxygen containing gas to produce regenerated catalyst which is withdrawn from said catalyst bed via a single catalyst outlet having a diameter of at least 5 feet which is in the center of said regenerator and is radially displaced from said catalyst inlets.

9. The process of claim 8 further characterized in that two coked catalyst inlets, located 180 degrees apart, are used.

10. The process of claim 8 further characterized in that four symmetrically placed catalyst inlets, located 90 degrees apart, are used for admission of coked catalyst.

11. The process of claim 8 further characterized in that said regenerator produces flue gas comprising CO and oxides of nitrogen (NOx) and said split flow addition of coked catalyst, and catalyst withdrawal via a central outlet, reduces the CO and NOx content of said flue gas.

12. The process of claim 8 further characterized in that said regenerator has a coke burning capacity and said split flow addition of coked catalyst, and catalyst withdrawal via a central outlet, increases the coke burning capacity of said regenerator by at least 35%.

* * * * *